US010752756B2

United States Patent
Kasai et al.

(10) Patent No.: US 10,752,756 B2
(45) Date of Patent: Aug. 25, 2020

(54) ANTI-VIBRATION RUBBER COMPOSITION AND ANTI VIBRATION RUBBER

(71) Applicant: Sumitomo Riko Company Limited, Komaki-shi, Aichi (JP)

(72) Inventors: Seiji Kasai, Komaki (JP); Keiichi Muratani, Komaki (JP); Norihito Kimura, Komaki (JP)

(73) Assignee: SUMITOMO RIKO COMPANY LIMITED, Komaki-shi (JP)

( * ) Notice: Subject to any disclaimer, the term of this patent is extended or adjusted under 35 U.S.C. 154(b) by 60 days.

(21) Appl. No.: 16/031,110

(22) Filed: Jul. 10, 2018

(65) Prior Publication Data

US 2018/0312668 A1 Nov. 1, 2018

Related U.S. Application Data

(63) Continuation of application No. PCT/JP2017/029883, filed on Aug. 22, 2017.

(30) Foreign Application Priority Data

Aug. 31, 2016 (JP) .................................. 2016-169216

(51) Int. Cl.
 C08L 7/00 (2006.01)
 F16F 15/08 (2006.01)
 F16F 1/36 (2006.01)
 B60K 5/12 (2006.01)

(52) U.S. Cl.
 CPC .............. C08L 7/00 (2013.01); F16F 1/3605 (2013.01); F16F 15/08 (2013.01); *B60G 2204/41* (2013.01); *B60K 5/1208* (2013.01); *F16F 2224/025* (2013.01)

(58) Field of Classification Search
 CPC .................................. C08L 7/00; C08L 53/025
 See application file for complete search history.

(56) References Cited

U.S. PATENT DOCUMENTS

| 6,043,308 A | 3/2000 | Tanahashi et al. |
| 6,465,607 B2 | 10/2002 | Taguchi et al. |
| 6,642,308 B2 | 11/2003 | Nomura et al. |
| 6,858,675 B1 | 2/2005 | Taguchi et al. |
| 2004/0167281 A1* | 8/2004 | Takamatsu ............... C08C 1/00 525/99 |
| 2011/0166276 A1 | 7/2011 | Fujii et al. |
| 2015/0183969 A1* | 7/2015 | Tanaka ..................... C08L 7/00 524/505 |

FOREIGN PATENT DOCUMENTS

| JP | 3603173 B2 | 12/2004 |
| JP | 2011-052200 A | 3/2011 |
| JP | 2013-14706 A | 1/2013 |
| WO | 2012/120638 A1 | 9/2012 |

OTHER PUBLICATIONS

Henning, Reduced zinc loading: using ZMMA to activate accelerated sulfur vulcanization, Rubber World (2008), 238(5), 35-42.*
International Search Report dated Oct. 24, 2017, issued in counterpart International Application No. PCT/JP2017/029883 (2 pages).
Notification of Transmittal of Copies of Translation of the International Preliminary Report on Patentability (Form PCT/IB/338) issued in counterpart International Application No. PCT/JP2017/029883, dated Feb. 28, 2019, with Form PCT/IPEA/409. (5 pages).

* cited by examiner

*Primary Examiner* — Jeffrey C Mullis
(74) *Attorney, Agent, or Firm* — Westerman, Hattori, Daniels & Adrian, LLP

(57) ABSTRACT

Provided is an anti-vibration rubber composition, including the following components (A) to (D), in which a ratio of the component (B) to a total content of the components (A) and (B) is from 5 wt. % to 20 wt. %: (A) A natural rubber, or a blended rubber of the natural rubber and a butadiene rubber; (B) A hydrogenated styrene-butadiene block copolymer; (C) A sulfur-based vulcanizing agent; (D) Zinc monomethacrylate. Thus, there can be provided an anti-vibration rubber composition and an anti-vibration rubber each of which is excellent in heat resistance, and has both a high damping property and a low dynamic-to-static modulus ratio.

9 Claims, No Drawings

ANTI-VIBRATION RUBBER COMPOSITION AND ANTI VIBRATION RUBBER

RELATED APPLICATION

This application is a continuation of International Application No. PCT/JP2017/029883, filed on Aug. 22, 2017, which claims priority to Japanese Patent Application No. 2016-169216, filed on Aug. 31, 2016, the entire contents of each of which are hereby incorporated by reference.

TECHNICAL FIELD

The present disclosure relates to an anti-vibration rubber composition and an anti-vibration rubber to be used in, for example, a vehicle, such as an automobile or a train, and more specifically, to an anti-vibration rubber composition and an anti-vibration rubber to be used in, for example, a supporting function for an engine of an automobile or the like and an engine mount for suppressing vibration transmission.

BACKGROUND ART

Hitherto, an adaptive hydraulic anti-vibration device has been used as a member achieving both high damping and a low dynamic-to-static modulus ratio (see, for example, Patent Literature 1). However, owing to its complicated structure, the adaptive hydraulic anti-vibration device is difficult to downsize, and is also costly. Besides, the adaptive hydraulic anti-vibration device has such a problem that its anti-vibration property has directional dependence. Accordingly, it is desired that high damping and a low dynamic-to-static modulus ratio be both achieved in an anti-vibration rubber of a non-adaptive hydraulic type.

RELATED ART DOCUMENT

Patent Document

PTL 1: JP-B-3603173

SUMMARY OF INVENTION

However, when an attempt is made to enhance the high damping property in the anti-vibration rubber of a non-adaptive hydraulic type, the dynamic-to-static modulus ratio also increases. Conversely, when the dynamic-to-static modulus ratio is decreased, the damping property also decreases. Accordingly, it has heretofore been difficult to achieve both a high damping property and a low dynamic-to-static modulus ratio in the anti-vibration rubber of a non-adaptive hydraulic type. In addition, as a result of, for example, cars being made compact, the inside of an engine room tends to have a higher temperature than before, and hence the anti-vibration rubber is now particularly required to have heat resistance as well.

The present disclosure has been made in view of such circumstances, and an object of the present disclosure is to provide an anti-vibration rubber composition and an anti-vibration rubber each of which is excellent in heat resistance, and has both a high damping property and a low dynamic-to-static modulus ratio.

In order to achieve the above-mentioned object, according to a first aspect of the present disclosure, there is provided an anti-vibration rubber composition, including the following components (A) to (D), wherein a ratio of the component (B) to a total content of the components (A) and (B) is from 5 wt. % to 20 wt. %:

(A) a natural rubber, or a blended rubber of a natural rubber and a butadiene rubber;
(B) a hydrogenated styrene-butadiene block copolymer having a hydrogenation rate of from 10% to 90%;
(C) a sulfur-based vulcanizing agent; and
(D) zinc monomethacrylate.

In addition, according to a second aspect of the present disclosure, there is provided an anti-vibration rubber, including a vulcanized body of the anti-vibration rubber composition of the first aspect.

The inventors have made extensive investigations in order to solve the above-mentioned problems. As a result, the inventors have ascertained that both high damping and a low dynamic-to-static modulus ratio can be achieved when a specific amount of a hydrogenated styrene-butadiene block copolymer having a hydrogenation rate of from 10% to 90% (B) (hereinafter sometimes abbreviated as "hydrogenated styrene-butadiene block copolymer (B)") is used together with a natural rubber, or a blended rubber of a natural rubber and a butadiene rubber (A), as polymers of an anti-vibration rubber composition. The inventors have further ascertained that the anti-vibration rubber composition can be improved in heat resistance by containing zinc monomethacrylate (D). In the present disclosure, the hydrogenated styrene-butadiene block copolymer (B) is used as described above. In this regard, if a non-hydrogenated styrene-butadiene block copolymer is used, the double bond of its butadiene block reacts with the zinc monomethacrylate to prevent the zinc monomethacrylate from functioning as an anti-aging agent, and hence the heat resistance cannot be expected to be improved. However, the hydrogenated styrene-butadiene block copolymer (B) used in the present disclosure only partially reacts with the zinc monomethacrylate, and hence the remaining unreacted zinc monomethacrylate expresses the function of an anti-aging agent to improve heat aging resistance. The inventors have found that the desired object can be achieved as a result of the foregoing, and have thus achieved the present disclosure.

As described above, the anti-vibration rubber composition of the present disclosure contains, as polymers, the natural rubber, or the blended rubber of a natural rubber and a butadiene rubber (A) and the hydrogenated styrene-butadiene block copolymer having a hydrogenation rate of from 10% to 90% (B), and also contains the sulfur-based vulcanizing agent (C) and the zinc monomethacrylate (D). In addition, as described above, the anti-vibration rubber composition contains the hydrogenated styrene-butadiene block copolymer (B) at a specific ratio. Accordingly, the anti-vibration rubber composition is excellent in heat resistance, and has both a high damping property and a low dynamic-to-static modulus ratio. In addition, the anti-vibration rubber including the vulcanized body of the anti-vibration rubber composition is suitably used as an anti-vibration material for an engine mount, a stabilizer bush, a suspension bush, and the like to be used in a vehicle, such as an automobile. In addition to the foregoing, the anti-vibration rubber may also be used in the following applications: vibration-proof dampers for hard disks of computers, vibration-proof dampers for general home electrical appliances, such as washing machines, and quakeproof (vibration-proof) devices and seismic isolation devices, such as architectural quakeproof walls and quakeproof (vibration-proof) dampers, in the fields of architecture and housing.

In addition, when the content of the sulfur-based vulcanizing agent (C) falls within the range of from 0.2 parts by weight to 1 part by weight with respect to 100 parts by weight of the total content of the components (A) and (B), which are the polymers of the anti-vibration rubber composition of the present disclosure, the anti-vibration rubber composition can be satisfactorily vulcanized without the impairment of its heat resistance or the like.

DESCRIPTION OF EMBODIMENTS

Next, an embodiment of the present disclosure is described in detail.

As described above, an anti-vibration rubber composition of the present disclosure contains, as polymers, a natural rubber, or a blended rubber of a natural rubber and a butadiene rubber (A) and a hydrogenated styrene-butadiene block copolymer having a hydrogenation rate of from 10% to 90% (B), and also contains a sulfur-based vulcanizing agent (C) and zinc monomethacrylate (D). In addition, the ratio of the hydrogenated styrene-butadiene block copolymer (B) in the polymers (total of the components (A) and (B)) is set to from 5 wt. % to 20 wt. %. The ratio of the hydrogenated styrene-butadiene block copolymer (B) in the polymers preferably falls within the range of from 10 wt. % to 20 wt. %. With this, the anti-vibration rubber composition is excellent in heat resistance, and has both a high damping property and a low dynamic-to-static modulus ratio. When the ratio of the hydrogenated styrene-butadiene block copolymer (B) is excessively low, the desired high damping property is not achieved. In contrast, when the ratio of the hydrogenated styrene-butadiene block copolymer (B) is excessively high, the desired low dynamic-to-static modulus ratio is not achieved, and moreover, a compression set is worsened.

From the viewpoint of achieving properties required of the anti-vibration rubber composition of the present disclosure, the ratio of the natural rubber in the polymers (total of the components (A) and (B)) falls within the range of preferably from 50 wt. % to 95 wt. %, more preferably from 50 wt. % to 70 wt. %, and the ratio of the butadiene rubber in the polymers falls within the range of preferably from 0 wt. % to 40 wt. %, more preferably from 10 wt. % to 40 wt. %.

Incidentally, the "hydrogenated styrene-butadiene block copolymer" serving as the component (B) is a product obtained by forming butylene blocks through hydrogenation of part of double bond moieties of butadiene blocks in a styrene-butadiene block copolymer. In addition, the hydrogenation rate of the hydrogenated styrene-butadiene block copolymer (B) falls within the range of from 10% to 90%, preferably the range of from 30% to 90%. That is, such range is adopted because of the following reasons: when the hydrogenation rate is lower than the range, a desired anti-vibration property based on the achievement of both a high damping property and a low dynamic-to-static modulus ratio is not obtained; and in contrast, when the hydrogenation rate is higher than the range, it becomes difficult to crosslink the hydrogenated styrene-butadiene block copolymer (B). The hydrogenation rate of the hydrogenated styrene-butadiene block copolymer (B) represents the ratio of block structures having no double bond in the copolymer, and is calculated on the basis of a ratio among structures measured by $^1$H-NMR.

Examples of the sulfur-based vulcanizing agent (C) to be used together with the polymers serving as the components (A) and (B) include: sulfur, sulfur chloride, and other forms of sulfur (powdery sulfur, precipitated sulfur, and insoluble sulfur); 2-mercaptoimidazoline; and dipentamethylenethiuram pentasulfide. Those sulfur-based vulcanizing agents may be used alone or in combination.

The blending amount of the sulfur-based vulcanizing agent (C) preferably falls within the range of from 0.2 parts by weight to 1 part by weight with respect to 100 parts by weight of the polymers (total of the components (A) and (B)). That is, such range is adopted because of the following reasons: when the blending amount of the vulcanizing agent is excessively small, there is observed such a tendency that a sufficient crosslinked structure is not obtained and hence the dynamic-to-static modulus ratio and permanent set resistance are deteriorated; and in contrast, when the blending amount of the vulcanizing agent is excessively large, there is observed such a tendency that the heat resistance is reduced.

In addition, the blending amount of the zinc monomethacrylate (D) to be used together with the polymers and the sulfur-based vulcanizing agent falls within preferably the range of from 0.5 parts by weight to 10 parts by weight, more preferably the range of from 1 part by weight to 6 parts by weight with respect to 100 parts by weight of the polymers (total of the components (A) and (B)). That is, such range is adopted because of the following reasons: when the content of the zinc monomethacrylate is lower than the range, a desired anti-heat aging effect is not obtained; and in contrast, when the content is higher than the range, the crosslinked state of the rubber composition is changed to deteriorate the anti-vibration property and the permanent set resistance.

In addition, the anti-vibration rubber composition of the present disclosure preferably further contains an inorganic filler together with the components (A) to (D) because more excellent reinforceability is obtained. Examples of the inorganic filler include a white filler and carbon black. Of those, carbon black is preferably used because of particularly excellent reinforceability.

As the carbon black, there are used carbon blacks of various grades, such as SAF grade, ISAF grade, HAF grade, MAF grade, FEF grade, GPF grade, SRF grade, FT grade, and MT grade. Those carbon blacks may be used alone or in combination.

In addition, the blending amount of the carbon black falls within preferably the range of from 10 parts by weight to 140 parts by weight, particularly preferably the range of from 20 parts by weight to 70 parts by weight with respect to 100 parts by weight of the polymers (total of the components (A) and (B)). That is, such range is adopted because of the following reasons: when the blending amount of the carbon black is excessively small, a certain level of reinforceability cannot be satisfied; and in contrast, when the blending amount of the carbon black is excessively large, a problem, such as an increase in dynamic-to-static modulus ratio or the deterioration of processability due to an increase in viscosity, occurs.

In addition, as required, the following components may be appropriately blended into the anti-vibration rubber composition of the present disclosure in addition to the above-mentioned components: a process oil, an anti-aging agent, a processing aid, a vulcanization accelerator, a reactive monomer, a foaming agent, and the like. In the present disclosure, the zinc monomethacrylate (D), which serves as a vulcanization aid, is used as an essential component as described above, and for example, the following vulcanization aids may be blended in combination therewith: monomethacrylic acid metal salts other than zinc monomethacrylate (e.g., aluminum salt, calcium salt, and magnesium salt), dimethacrylic acid metal salts (e.g., zinc salt, aluminum salt, calcium salt, and magnesium salt), zinc oxide (ZnO), stearic acid, and magnesium oxide.

In addition, examples of the vulcanization accelerator include thiazole-, sulfenamide-, thiuram-, aldehyde ammonia-, aldehyde amine-, guanidine-, and thiourea-based vulcanization accelerators. Those vulcanization accelerators may be used alone or in combination. Of those, a sulfenamide-based vulcanization accelerator is preferred because of its excellent crosslinking reactivity.

The blending amount of the vulcanization accelerator falls within preferably the range of from 0.5 parts by weight to 7 parts by weight, particularly preferably the range of from 0.5 parts by weight to 5 parts by weight with respect to 100 parts by weight of the polymers (total of the components (A) and (B)).

Examples of the thiazole-based vulcanization accelerator include dibenzothiazyl disulfide (MBTS), 2-mercaptobenzothiazole (MBT), sodium 2-mercaptobenzothiazole (NaMBT), and zinc 2-mercaptobenzothiazole (ZnMBT). Those vulcanization accelerators may be used alone or in combination thereof. Of those, dibenzothiazyl disulfide (MBTS) or 2-mercaptobenzothiazole (MBT) is particularly suitably used because of its excellent crosslinking reactivity.

In addition, examples of the sulfenamide-based vulcanization accelerator include N-oxydiethylene-2-benzothiazolylsulfenamide (NOBS), N-cyclohexyl-2-benzothiazolylsulfenamide (CBS), N-t-butyl-2-benzothiazolesulfenamide (BBS), and N,N'-dicyclohexyl-2-benzothiazolesulfenamide.

In addition, examples of the thiuram-based vulcanization accelerator include tetramethylthiuram disulfide (TMTD), tetraethylthiuram disulfide (TETD), tetrabutylthiuram disulfide (TBTD), tetrakis(2-ethylhexyl)thiuram disulfide (TOT), and tetrabenzylthiuram disulfide (TBzTD).

Examples of the anti-aging agent include a carbamate-based anti-aging agent, a phenylenediamine-based anti-aging agent, a phenol-based anti-aging agent, a diphenylamine-based anti-aging agent, a quinoline-based anti-aging agent, an imidazole-based anti-aging agent, and waxes. Those anti-aging agents may be used alone or in combination.

In addition, the blending amount of the anti-aging agent falls within preferably the range of from 1 part by weight to 10 parts by weight, particularly preferably the range of from 2 parts by weight to 5 parts by weight with respect to 100 parts by weight of the polymers (total of the components (A) and (B)).

Examples of the process oil include a naphthene-based oil, a paraffin-based oil, and an aromatic oil. Those process oils may be used alone or in combination.

The blending amount of the process oil falls within preferably the range of from 1 part by weight to 50 parts by weight, particularly preferably the range of from 3 parts by weight to 30 parts by weight with respect to 100 parts by weight of the polymers (total of the components (A) and (B)).

Herein, the anti-vibration rubber composition of the present disclosure may be prepared by using the components (A) to (D) serving as its essential materials, and as required, other materials listed above, and kneading those materials through use of a kneading machine, such as a kneader, a Banbury mixer, an open roll, or a twin-screw stirrer.

The anti-vibration rubber composition of the present disclosure provides an anti-vibration rubber (vulcanized body) by being vulcanized at a high temperature (of from 150° C. to 170° C.) for from 5 minutes to 30 minutes. The anti-vibration rubber is suitably used as an anti-vibration material for an engine mount, a stabilizer bush, a suspension bush, and the like to be used in a vehicle, such as an automobile. In addition to the foregoing, the anti-vibration rubber may also be used in the following applications: vibration-proof dampers for hard disks of computers, vibration-proof dampers for general home electrical appliances, such as washing machines, and quakeproof (vibration-proof) devices and seismic isolation devices, such as architectural quakeproof walls and quakeproof (vibration-proof) dampers, in the fields of architecture and housing.

EXAMPLES

Next, Examples are described together with Comparative Examples. However, the present disclosure is not limited to these Examples.

First, prior to Examples and Comparative Examples, the following materials were prepared.

[NR]
Natural rubber
[BR]
Butadiene rubber (Nipol 1220, manufactured by Zeon Corporation)
[SEBS]
Hydrogenated styrene-butadiene block copolymer having an ethylene block (SOE L609, manufactured by Asahi Kasei Corporation)
[Zinc Oxide]
Zinc oxide type 2, manufactured by Sakai Chemical Industry Co., Ltd.
[Stearic Acid]
LUNAC S30, manufactured by Kao Corporation
[Anti-Aging Agent (i)]
OZONONE 6C, manufactured by Seiko Chemical Co., Ltd.
[Anti-Aging Agent (ii)]
NONFLEX RD, manufactured by Seiko Chemical Co., Ltd.
[Vulcanization Aid]
Zinc monomethacrylate (PRO11542, manufactured by Sartomer)
[Wax]
Sunnoc, manufactured by Ouchi Shinko Chemical Industrial Co., Ltd.
[Carbon Black]
Asahi #50U (average particle diameter: 70 nm, CTAB specific surface area: 27 $m^2/g$), manufactured by Asahi Carbon Co., Ltd.
[Oil]
Naphthene-based oil (Diana Process NM-280, manufactured by Idemitsu Kosan Co., Ltd.)
[Vulcanization Accelerator (i)]
N-Cyclohexyl-2-benzothiazolylsulfenamide (CBS) (NOCCELERCZ, manufactured by Ouchi Shinko Chemical Industrial Co., Ltd.)
[Vulcanization Accelerator (ii)]
Tetramethylthiuram disulfide (TMTD) (SANCELER TT, manufactured by Sanshin Chemical Industry Co., Ltd.)
[Vulcanizing Agent]
Sulfur, manufactured by Karuizawa Refinery Examples 1 to 8 and Comparative Examples 1 to 4

The above-mentioned materials were blended at ratios shown in Table 1 and Table 2 below, and were kneaded to prepare anti-vibration rubber compositions. The kneading was performed by first kneading the materials except for the vulcanizing agent and the vulcanization accelerator at 140° C. for 5 minutes through use of a Banbury mixer, and then blending the vulcanizing agent and the vulcanization accelerator, followed by kneading at 60° C. for 5 minutes through use of an open roll.

The evaluations of various properties were performed by using the anti-vibration rubber compositions of Examples and Comparative Examples thus obtained in accordance with the following criteria. The results are also shown in Table 1 and Table 2 below. In addition, a case in which all the evaluations were "0" was indicated with an overall evaluation of "○", and a case in which at least one of the evaluations was "x" was indicated with an overall evaluation of "x". In addition, a case in which none of the evaluations was "x" but not all the evaluations were "○" was indicated with an overall evaluation of "Δ".

<<Initial Physical Properties>>

Each of the anti-vibration rubber compositions was subjected to press molding (vulcanized) under the conditions of 160° C.×20 minutes to produce a rubber sheet having a thickness of 2 mm. Then, a JIS No. 5 dumbbell was punched out of the rubber sheet, and the dumbbell was used and measured for its tensile strength at break (TB) and elongation at break (EB) in conformity with JIS K 6251. Then, a case in which the TB was 17 MPa or more and the EB was 400% or more was evaluated as "○".

<<Change Ratio of Elongation at Break after Heat Aging>>

The rubber sheet produced above was subjected to heat aging under a 100° C. atmosphere for 500 hours and then measured for its elongation at break (EB) in the same manner as above, and the degree of reduction in elongation at break after heat aging with respect to the elongation at break of the rubber sheet at the initial stage (before heat aging) (change ratio of elongation at break after heat aging) (%) was calculated. Then, a case in which the degree of reduction was more than 50% (the change ratio of elongation at break after heat aging was negative with respect to −50%) was evaluated as "x", and a case in which the degree of reduction was 50% or less (the change ratio of elongation at break after heat aging was from 0% to −50%) was evaluated as "○".

<<Compression Set>>

Each of the anti-vibration rubber compositions was subjected to press molding (vulcanized) under the conditions of 160° C.×30 minutes to produce a test piece. Next, the test piece was kept under the conditions of 100° C.×500 hours in a state of 25% compression, and then its compression set was measured in accordance with JIS K 6262. Then, a case in which the resultant value of the compression set was 50% or less was evaluated as "○", and a case in which the value was more than 50% and 60% or less was evaluated as "Δ".

<<Damping Property>>

Each of the anti-vibration rubber compositions was subjected to press molding (vulcanized) under the conditions of 160° C.×30 minutes to produce a test piece. Next, its loss factor (tan δ) at a frequency of 15 Hz was determined in conformity with JIS K 6385. Then, a case in which the resultant value of the loss factor (tan δ) was 0.060 or more was evaluated as "○", and a case in which the value was less than 0.060 was evaluated as "x".

<<Dynamic-to-Static Modulus Ratio>>

Each of the anti-vibration rubber compositions was subjected to press molding (vulcanized) under the conditions of 160° C.×30 minutes to produce a test piece. The dynamic spring constant (Kd100) and static spring constant (Ks) of the test piece were each measured in conformity with JIS K 6394. On the basis of the measured values, a dynamic-to-static modulus ratio (Kd100/Ks) was calculated. Then, a case in which the calculated value was 2.50 or less was evaluated as "○", and a case in which the calculated value was more than 2.50 was evaluated as "x".

TABLE 1

| | | | | | | | | | (part(s)by weight) |
|---|---|---|---|---|---|---|---|---|---|
| | | Example | | | | | | | |
| | | 1 | 2 | 3 | 4 | 5 | 6 | 7 | 8 |
| NR | | 70 | 70 | 70 | 70 | 70 | 70 | 50 | 90 |
| BR | | 25 | 20 | 10 | 20 | 20 | 20 | 40 | — |
| SEBS | | 5 | 10 | 20 | 10 | 10 | 10 | 10 | 10 |
| Zinc oxide | | 5 | 5 | 5 | 5 | 5 | 5 | 5 | 5 |
| Stearic acid | | 1 | 1 | 1 | 1 | 1 | 1 | 1 | 1 |
| Anti-aging agent (i) | | 1.5 | 1.5 | 1.5 | 1.5 | 1.5 | 1.5 | 1.5 | 1.5 |
| Anti-aging agent (ii) | | 1 | 1 | 1 | 1 | 1 | 1 | 1 | 1 |
| Vulcanization aid | | 3 | 3 | 3 | 3 | 0.5 | 10 | 3 | 3 |
| Wax | | 2 | 2 | 2 | 2 | 2 | 2 | 2 | 2 |
| Carbon black | | 30 | 30 | 30 | 30 | 30 | 30 | 30 | 30 |
| Oil | | 5 | 5 | 5 | 5 | 5 | 5 | 5 | 5 |
| Vulcanization accelerator (i) | | 2 | 2 | 2 | 2 | 2 | 2 | 2 | 2 |
| Vulcanization accelerator (ii) | | 1 | 1 | 1 | 1 | 1 | 1 | 1 | 1 |
| Vulcanizing agent | | 0.5 | 0.5 | 0.5 | 1 | 1 | 1 | 1 | 1 |
| Initial physical properties | TB (MPa) | 18.1 | 18.6 | 19.1 | 18.6 | 18.5 | 18.3 | 17.2 | 19.6 |
| | EB (%) | 570 | 580 | 570 | 480 | 570 | 530 | 480 | 600 |
| | Evaluation | ○ | ○ | ○ | ○ | ○ | ○ | ○ | ○ |
| Change ratio of elongation at break after heat aging | (%) | −38 | −41 | −41 | −49 | −49 | −35 | −40 | −40 |
| | Evaluation | ○ | ○ | ○ | ○ | ○ | ○ | ○ | ○ |
| Compression set | (%) | 42 | 43 | 45 | 45 | 42 | 49 | 39 | 55 |
| | Evaluation | ○ | ○ | ○ | ○ | ○ | ○ | ○ | Δ |
| Damping property | tan δ | 0.064 | 0.093 | 0.148 | 0.085 | 0.089 | 0.103 | 0.084 | 0.116 |
| | Evaluation | ○ | ○ | ○ | ○ | ○ | ○ | ○ | ○ |

TABLE 1-continued

|  |  | Example | | | | | | | | (part(s) by weight) |
| --- | --- | --- | --- | --- | --- | --- | --- | --- | --- | --- |
|  |  | 1 | 2 | 3 | 4 | 5 | 6 | 7 | 8 |  |
| Dynamic-to-static modulus ratio | Kd100/Ks | 1.45 | 1.71 | 2.30 | 1.56 | 1.69 | 1.79 | 1.62 | 2.06 |  |
|  | Evaluation | ◯ | ◯ | ◯ | ◯ | ◯ | ◯ | ◯ | ◯ |  |
| Overall evaluation |  | ◯ | ◯ | ◯ | ◯ | ◯ | ◯ | ◯ | Δ |  |

TABLE 2

|  |  | (part(s) by weight) Comparative Example | | | |
| --- | --- | --- | --- | --- | --- |
|  |  | 1 | 2 | 3 | 4 |
| NR |  | 70 | 70 | 70 | 70 |
| BR |  | 30 | 27 | 5 | 20 |
| SEBS |  | — | 3 | 25 | 10 |
| Zinc oxide |  | 5 | 5 | 5 | 5 |
| Stearic acid |  | 1 | 1 | 1 | 1 |
| Anti-aging agent (i) |  | 1.5 | 1.5 | 1.5 | 1.5 |
| Anti-aging agent (ii) |  | 1 | 1 | 1 | 1 |
| Vulcanization aid |  | 3 | 3 | 3 | — |
| Wax |  | 2 | 2 | 2 | 2 |
| Carbon black |  | 30 | 30 | 30 | 30 |
| Oil |  | 5 | 5 | 5 | 5 |
| Vulcanization accelerator (i) |  | 2 | 2 | 2 | 2 |
| Vulcanization accelerator (ii) |  | 1 | 1 | 1 | 1 |
| Vulcanizing agent |  | 0.5 | 0.5 | 0.5 | 1 |
| Initial physical properties | TB (MPa) | 18.5 | 18.7 | 18.0 | 19.0 |
|  | EB (%) | 560 | 580 | 550 | 590 |
|  | Evaluation | ◯ | ◯ | ◯ | ◯ |
| Change ratio of elongation at break after heat aging | (%) | −40 | −38 | −38 | −61 |
|  | Evaluation | ◯ | ◯ | ◯ | x |
| Compression set | (%) | 40 | 41 | 53 | 41 |
|  | Evaluation | ◯ | ◯ | Δ | ◯ |
| Damping property | tanδ | 0.051 | 0.058 | 0.185 | 0.088 |
|  | Evaluation | x | x | ◯ | ◯ |
| Dynamic-to-static modulus ratio | Kd100/Ks | 1.30 | 1.36 | 2.71 | 1.66 |
|  | Evaluation | ◯ | ◯ | x | ◯ |
| Overall evaluation |  | x | x | x | x |

As apparent from the results shown in Table 1, each of the rubber compositions of Examples is excellent in initial physical properties as an anti-vibration rubber composition (TB and EB), and is also excellent in change ratio of elongation at break after heat aging and compression set property, thus being excellent in heat resistance. Besides, the rubber compositions of Examples each have both a high damping property and a low dynamic-to-static modulus ratio.

In contrast, the rubber composition of Comparative Example 1, which did not contain the SEBS, had an inferior result in damping property to those of the rubber compositions of Examples. The rubber composition of Comparative Example 2, in which the content of the SEBS was excessively low, did not achieve a sufficient damping property, and the rubber composition of Comparative Example 3, in which the content of the SEBS was excessively high, had poor results in compression set and dynamic-to-static modulus ratio. The rubber composition of Comparative Example 4, which did not contain zinc monomethacrylate, had a poor result in elongation at break after heat aging.

In Examples described above, specific embodiments in the present disclosure have been described. However, Examples described above are merely illustrative and should not be construed as being limitative. Various modifications apparent to a person skilled in the art are meant to be within the scope of the present disclosure.

The anti-vibration rubber composition of the present disclosure is suitably used as a material for forming an engine mount, a stabilizer bush, a suspension bush, and the like to be used in a vehicle, such as an automobile. In addition to the foregoing, the anti-vibration rubber composition may also be used as a material for forming vibration-proof dampers for hard disks of computers, vibration-proof dampers for general home electrical appliances, such as washing machines, and quakeproof (vibration-proof) devices and seismic isolation devices, such as architectural quakeproof walls and quakeproof (vibration-proof) dampers, in the fields of architecture and housing.

The invention claimed is:

1. An anti-vibration rubber composition, comprising:
    (A) a natural rubber, or a blended rubber of the natural rubber and a butadiene rubber;
    (B) a hydrogenated styrene-butadiene block copolymer having a hydrogenation rate of from 10% to 90%;
    (C) a sulfur-based vulcanizing agent; and
    (D) zinc monomethacrylate,
    wherein a ratio of the component (B) to a total content of the components (A) and (B) is from 5 wt. % to 20 wt. %,
    wherein a content of component (D) falls within a range of from 0.5 parts by weight to 10 parts by weight with respect to 100 parts by weight of the total content of the components (A) and (B),
    wherein a ratio of the natural rubber to the total content of the components (A) and (B) falls within a range of from 50 wt. % to 85 wt. %, and
    wherein a ratio of the butadiene rubber to the total content of the components (A) and (B) falls within a range of from 10 wt. % to 40 wt. %.

2. The anti-vibration rubber composition according to claim 1, wherein a content of the component (C) falls within a range of from 0.2 parts by weight to 1 part by weight with respect to 100 parts by weight of the total content of the components (A) and (B).

3. The anti-vibration rubber composition according to claim 1, wherein the component (B) comprises polystyrene-poly(ethylene/butylene) block-polystyrene.

4. An anti-vibration rubber, comprising a vulcanized body of the anti-vibration rubber composition of claim 1.

5. An anti-vibration rubber composition comprising:
    (A) a natural rubber, or a blended rubber of the natural rubber and a butadiene rubber;
    (B) a hydrogenated styrene-butadiene block copolymer having a hydrogenation rate of from 10% to 90%;
    (C) a sulfur-based vulcanizing agent; and
    (D) zinc monomethacrylate,
    wherein a ratio of the component (B) to a total content of the components (A) and (B) is from 5 wt. % to 20 wt. %, wherein a content of component (D) falls within a range of from 0.5 parts by weight to 10 parts by weight with respect to 100 parts by weight of the total content of the components (A) and (B), wherein the anti-vibration rubber composition further comprises a zinc oxide.

6. The anti-vibration rubber composition according to claim 5, wherein a content of the component (C) falls within a range of from 0.2 parts by weight to 1 part by weight with respect to 100 parts by weight of the total content of the components (A) and (B).

7. The anti-vibration rubber composition according to claim 5, wherein the component (B) comprises polystyrene-poly(ethylene/butylene) block-polystyrene.

8. The anti-vibration rubber composition according to claim 5, wherein a ratio of the natural rubber to the total content of the components (A) and (B) falls within a range of from 50 wt. % to 85 wt. %, and wherein a ratio of the butadiene rubber to the total content of the components (A) and (B) falls within a range of from 10 wt. % to 40 wt. %.

9. An anti-vibration rubber, comprising a vulcanized body of the anti-vibration rubber composition of claim 5.

* * * * *